(12) United States Patent
Kwon et al.

(10) Patent No.: US 7,125,123 B2
(45) Date of Patent: Oct. 24, 2006

(54) IMAGE PROJECTOR

(75) Inventors: Soon Hyung Kwon, Seoul (KR); Seung Gyu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/898,533

(22) Filed: Jul. 22, 2004

(65) Prior Publication Data
US 2005/0018145 A1    Jan. 27, 2005

(30) Foreign Application Priority Data
Jul. 23, 2003    (KR) .................. P10-2003-0050536

(51) Int. Cl.
*G03B 21/14*    (2006.01)
(52) U.S. Cl. .............................. 353/84; 348/743; 349/7
(58) Field of Classification Search ................... 353/31, 353/84; 348/742, 743, 771, 5, 7, 8; 359/889, 359/891
See application file for complete search history.

(56) References Cited

U.S. PATENT DOCUMENTS

| | | | |
|---|---|---|---|
| 6,334,685 B1 | 1/2002 | Slobodin | |
| 6,726,333 B1 * | 4/2004 | Huibers et al. ................ | 353/84 |
| 6,813,087 B1 * | 11/2004 | Davis .......................... | 359/634 |
| 6,830,343 B1 * | 12/2004 | Song ........................... | 353/84 |
| 2002/0101546 A1 | 8/2002 | Sharp et al. | |
| 2002/0109821 A1 | 8/2002 | Huibers et al. | |
| 2003/0142241 A1 * | 7/2003 | Allen et al. .................. | 348/742 |
| 2003/0227577 A1 * | 12/2003 | Allen et al. .................. | 348/742 |
| 2004/0008288 A1 * | 1/2004 | Pate et al. .................... | 348/742 |
| 2005/0018145 A1 * | 1/2005 | Kwon et al. ................... | 353/84 |
| 2005/0151936 A1 * | 7/2005 | Nonaka ........................ | 353/84 |

FOREIGN PATENT DOCUMENTS

| | | |
|---|---|---|
| JP | 08-140106 | 5/1996 |
| WO | WO 02/32149 A2 | 4/2002 |

* cited by examiner

*Primary Examiner*—William C. Dowling
(74) *Attorney, Agent, or Firm*—Lee, Hong, Degerman, Kang & Schmadeka

(57) ABSTRACT

An image projector is disclosed. The image projector includes a lamp emitting light rays, a filtering unit having a first device including a plurality of color filters including a white color filter each formed to correspond to a section therein, and a second device including a plurality of color filters except a white color filter each formed to correspond to a section therein and formed at one side of the first device, and filtering the light rays emitted from the lamp through any one of the first device and the second device, a rod lens focusing and projecting the light rays separated from the filtering unit, and a digital micromirror device displaying an image through electric signals in accordance with the projected light rays.

7 Claims, 3 Drawing Sheets

(a)

(b)

(c)

IMAGE PROJECTOR

CROSS-REFERENCE TO RELATED APPLICATIONS

This application claims the benefit of Korean Application No. P2003-050536, filed on Jul. 23, 2003, which is hereby incorporated by reference as if fully set forth herein.

BACKGROUND OF THE INVENTION

1. Field of the Invention

The present invention relates to a display device, and more particularly, to an image projector. Although the present invention is suitable for a wide scope of applications, it is particularly suitable for selecting one of image brightness and color definition through a single projector, when viewing a projected image, thereby projecting the image in accordance with the user's preference.

2. Discussion of the Related Art

As image projection devices, also known as the projector, are being extensively introduced and provided, diverse types of product are being developed and sold on the market. Such image projection devices are under development for a structure focusing on the brightness of the projection and the compact size and light weight of the device.

An optical part of a general image projection device includes a lamp as a light source, an illuminating part focusing the light emitted from the lamp, an image display device representing the focused light into an image, and a projecting part enlarging the image displayed on the image display device and projecting the enlarged image onto a screen.

In the present technology, high pressure mercury lamps are most widely used as the lamp of the image projection device, and liquid crystal displays (LCDs) and digital micromirror devices (DMDs) are most widely used as the image display device of the projector. Additionally, depending upon the number of image display devices used, the image projection device can be categorized as a single-chip projector, a two (2)-chip projector, and a three (3)-chip projector.

As the recent trend introduces projectors of compact size, light weight, and low cost, single-chip optical parts using only a single image display device is generally used.

The single-chip image projection device includes a projector type mounting color filters of red, green, and blue, a projector type externally separating red, green, and blue light rays and simultaneously illuminating the separated light rays to the image display device, and a projector type externally and sequentially illuminating red, green, and blue light rays onto the image display device with a time interval. Herein, when using the projector type externally and sequentially illuminating red, green, and blue light rays onto the image display device with a time interval, the response speed of the image projection device is required to be three times faster than that of the three (3)-chip image projection device. In the recent technology, the digital micromirror device (DMD) most satisfies such requirements.

A color separating device is formed in order to illuminate separated light rays onto the image display device. When using the projector for presentations focusing on the brightness of the screen is important, a four-sectioned color wheel should be used. On the other hand, when using the projector for viewing video images emphasizing various colors, a three-sectioned color wheel should be used. The same principle applies to a color drum.

As described above, the single-chip DMD projector is disadvantageous in that an adequate color separating device emphasizing either one of brightness or color representation should be selected, depending upon whether the product is focused on the brightness of the screen or the color picture quality of the image. However, the single-chip projector used in the current technology cannot satisfy the user environment of the recent multimedia trend requiring both characteristics (i.e., brightness and color representation).

SUMMARY OF THE INVENTION

Accordingly, the present invention is directed to an image projector that substantially obviates one or more problems due to limitations and disadvantages of the related art.

An object of the present invention is to provide an image projector using a color separating device that can selectively enhance either the brightness or the color definition of an image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an image projector includes a lamp emitting light rays, a filtering unit having a first device including a plurality of color filters including a white color filter each formed to correspond to a section therein, and a second device including a plurality of color filters except a white color filter each formed to correspond to a section therein and formed at one side of the first device, and filtering the light rays emitted from the lamp through any one of the first device and the second device, a rod lens focusing and projecting the light rays separated from the filtering unit, and a digital micromirror device displaying an image through electric signals in accordance with the projected light rays.

Herein, the first device and the second device are one of a color wheel and a color drum.

The image projector according to the present invention further includes a controller selecting any one of the first device and the second device of the filtering unit.

Herein, one of the first device and the second device is selected from the filtering unit in accordance with one of horizontal and vertical movements of the filtering unit based on control signals of the controller.

In another aspect of the present invention, an image projector includes a lamp emitting light, a first filtering unit having a plurality of color filters including a white color filter, a second filtering unit having a plurality of color filters including a white color filter, wherein any one of the color filters overlaps with any one of the color filters arranged in the first filtering unit, a rod lens focusing and projecting the light rays separated from the first and second filtering units, and a digital micromirror device displaying an image through electric signals in accordance with the projected light rays.

Herein, the white color filter of the second filtering unit is smaller than the white color filter of the first filtering unit.

Also, a size of the white color filter of the second filtering unit is equal to a spot size, which is a focused size of the light emitted from the lamp.

The white color filter of the second filtering unit is positioned on an optical path, when a user desires to emphasize a brightness of the image. Conversely, the white color filter of the first filtering unit is positioned on an optical path, when a user desires to emphasize a color definition of the image.

Also, the first filtering unit and the second filtering unit are sequentially arranged between the lamp and the rod lens. Herein, the first filtering unit is arranged between the lamp and the rod lens, and the second filtering unit is arranged behind the rod lens.

Each of the first and second filtering units is a color wheel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1A:
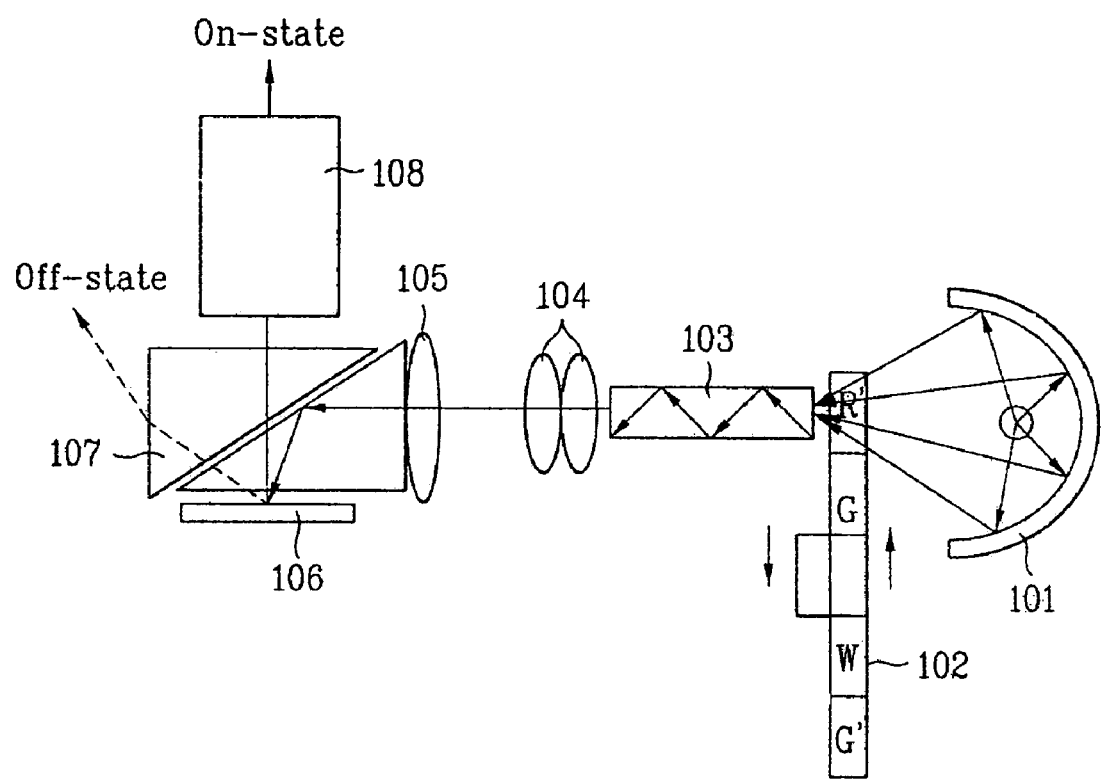
FIG. 1A illustrates an optical part of an image projector according to a first embodiment of the present invention.

FIG. 1A illustrates an optical part of an image projector according to a first embodiment of the present invention.

Referring to FIG. 1A, the projector includes a lamp 101, a color wheel 102, a rod lens 103, a first illuminating lens group 104, a second illuminating lens 105, a digital micromirror device (DMD) 106, a total internal reflection (TIR) prism 107, and a projection lens 108. The light ray emitted from the lamp 101, which is the light source, is focused to a light incident surface of the rod lens 103 by an oval mirror. Herein, the color wheel 102 is positioned between the lamp 101 and the rod lens 103, so as to sequentially separate the light ray into red, green, and blue light rays.

In order to broaden the scope of color representation, a yellow color filter can be included in an area other than the regions corresponding to the colors red, green, and blue. Moreover, a filter of a different color can also be included herein. Based on the principles of optical science, such options can be easily understood without any additional technological explanations, and so detailed descriptions of the same will be omitted for simplicity.

The color wheel 102 is formed between the lamp 101 and the rod lens 103 because the cross-sectional area of the light ray emitted from the lamp 101 is minimized when nearing the light incident surface of the rod lens 103. Accordingly, by installing the color wheel 102 at a region whereby the cross-sectional area of the light ray is minimized, the size of the color wheel 102 can also be minimized.

Figure 1B:
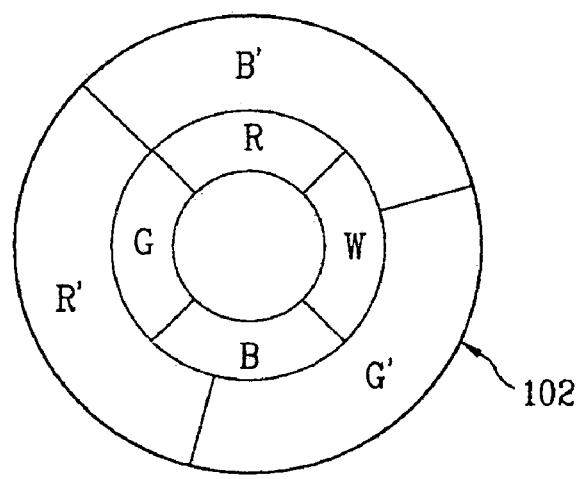
FIG. 1B illustrates a color wheel of the image projector according to the first embodiment of the present invention.

FIG. 1B illustrates a color wheel of the image projector according to the first embodiment of the present invention.

Referring to FIG. 1B, the color filters of the color wheels are arranged in a double layer form. More specifically, the color wheel 102 is divided into an internal portion and an external portion. Herein, the internal portion of the color wheel 102 is formed of four sections including a red color filter, a green color filter, a blue color filter, and a white color filter. The external portion of the color wheel is formed of three sections including a red color filter, a green color filter, and a blue color filter.

The structures of the internal and external portions of the color wheel 102 can also be alternated (i.e., the four-sectioned structure corresponding to the external portion and the three-sectioned structure corresponding to the internal portion of the color wheel 102). This is because a separate controller can arbitrarily select one of the first and second modes corresponding to each of the internal and external portions of the color wheel.

In addition, the color filters are formed by dichroic coating through a masking method.

Meanwhile, due to a mechanical movement of the color wheel 102 in a direction perpendicular to the axis of the light ray, the color wheel 102 can have color modes different from one another. More specifically, for example, when the brightness of the image should be emphasized, as when used in a presentation, the four-sectioned color mode is selected. On the other hand, when the color definition of the image should be emphasized, as when viewing a video image, the color mode is converted into the three-sectioned color mode. Herein, the vertical movement of the color wheel 102 can be controlled by a microprocessor of the controller.

Subsequently, the light ray filtered from the color wheel 102 is incident to the rod lens 103. The rod lens 103 is formed to have a cubic structure, and projects the light rays incident therein back to the outside through a total reflection. At this point, although the brightness of the light incident surface of the rod lens fails to be uniform, the incident light is totally reflected from the inside, thereby allowing the brightness of the light incident surface to be uniform. The uniformity of the brightness may differ depending upon the length of the rod lens or the type of light carrier.

The rod lens 103 can be basically categorized into two structure types. More specifically, the rod lens 103 may include a mirror reflection structure, whereby the inside of the rod lens 103 is empty and has an inner interface formed of a mirror. The rod lens 103 may also include an internal total reflection structure, whereby the rod lens 103 is formed of a glass having a high refractive index.

The DMD 106 projects the light ray having a uniform luminance distribution through the rod lens 103 through a plurality of first illuminating lenses 104 and the second illuminating lens 105. The projected light ray is then projected to the total internal reflection (TIR) prism 107. Herein, the TIR prism 107 is formed of two prisms joined to each other while having a fine air gap therebetween. The incident light is totally internally reflected at an interface of a first prism and, then, projected to the DMD 106.

A plurality of micromirrors (not shown) corresponding to each pixel is formed above a DMD surface of the DMD 106. Herein, each of the micromirrors has a ±θ tilt mode depending upon an external electric signal. In the recent technology, θ is commonly set to either 10 degrees or 12 degrees.

When the DMD 106 receives a white color signal, due to the tilting of the micromirrors, the light ray is reflected to an angle different from that of the incident angle. Accordingly, the reflected light ray is passed through to the projection lens 108 without a total internal reflection from the TIR prism 107. The light ray passing through the TIR prism 107 is enlarged to form an image on a screen (not shown) through the projection lens 108.

Figure 2A:
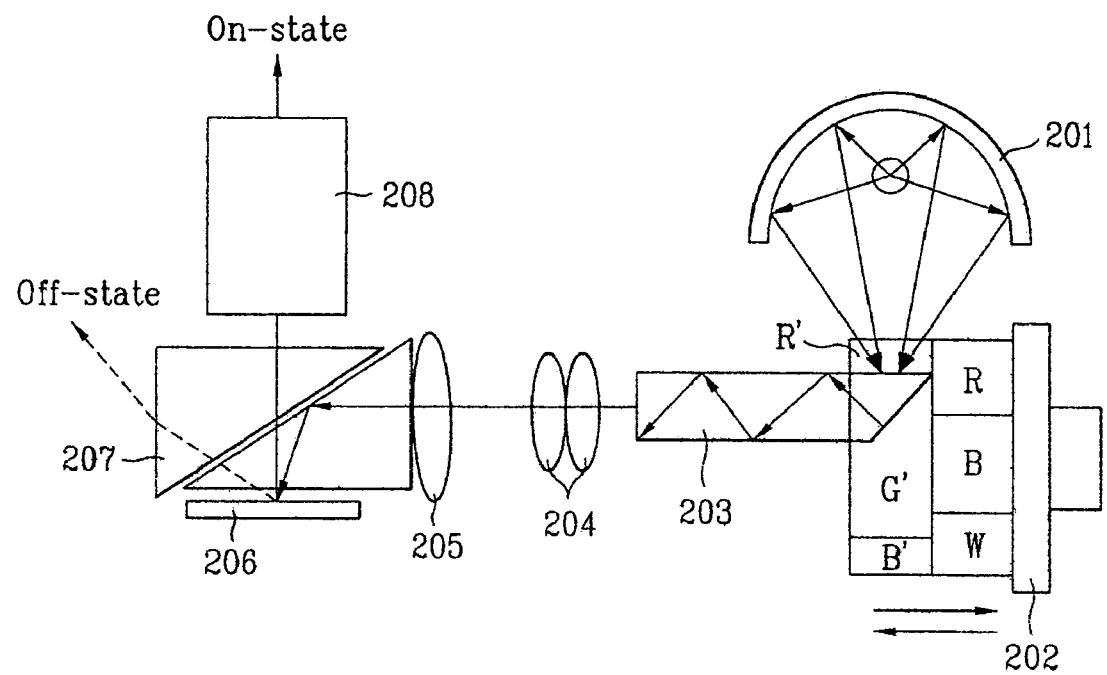
FIG. 2A illustrates an optical part of the image projector according to a second embodiment of the present invention.

FIG. 2A illustrates an optical part of the image projector according to a second embodiment of the present invention.

Referring to FIG. 2A, the projector includes a lamp 201, a color drum 202, a rod lens 203, a first illuminating lens group 204, a second illuminating lens 205, a digital micromirror device (DMD) 206, a total internal reflection (TIR) prism 207, and a projection lens 208. With the exception of the color drum 202, the structure and operation of the projector according to the second embodiment of the present invention is identical to that of the projector according to the first embodiment of the present invention, shown in FIG. 1A, and, therefore, the detailed description of the same will be omitted for simplicity.

Figure 2B:
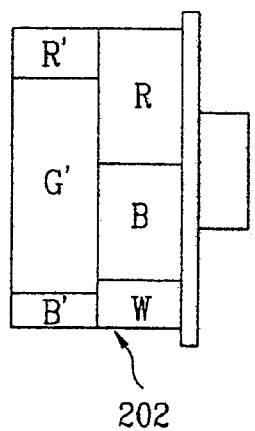
FIG. 2B illustrates a color drum of the image projector according to the second embodiment of the present invention.

FIG. 2B illustrates a color drum of the image projector according to the second embodiment of the present invention.

Referring to FIG. 2B, a color drum surface of the color drum 202 is divided into an internal portion and an external portion along the vertical direction of the color drum 202. Herein, the external portion of the color drum 202 is formed of three sections including a red color filter, a green color filter, and a blue color filter. And, the internal portion of the color drum 202 is formed of four sections including a red color filter, a green color filter, a blue color filter, and a white color filter. As described in FIG. 1B, the structures of the internal and external portions of the color drum 202 can also be alternated (i.e., the four-sectioned structure corresponding to the external portion and the three-sectioned structure corresponding to the internal portion of the color drum 202).

However, unlike the color wheel 102 shown in FIG. 1A, the color drum 202 is formed to make mechanical movements in a direction horizontal to the axis of the light ray. More specifically, unlike the color wheel 102, the first mode and the second mode of the color drum 202 are connected to each other three-dimensionally. Therefore, a user can select a desired mode only when the color drum 202 is moved along a horizontal direction of the axis of the light ray.

Herein, a microprocessor of a separate controller controls the movements of the color drum.

Figure 3:
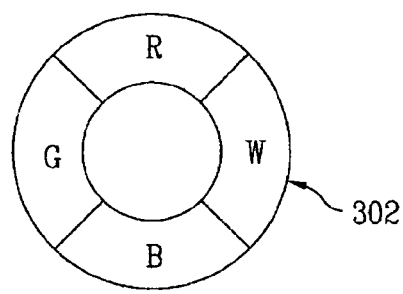
FIGS. 3A and 3B illustrate first and second color wheels of the image projector according to a third embodiment of the present invention.
FIG. 3C illustrates an optical part of the image projector according to the third embodiment of the present invention.
Figure 3:
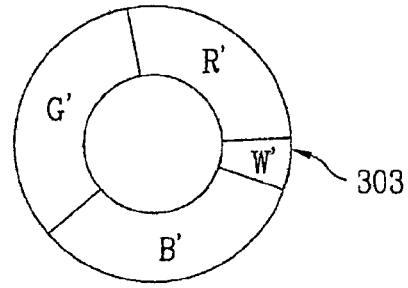
Figure 3:
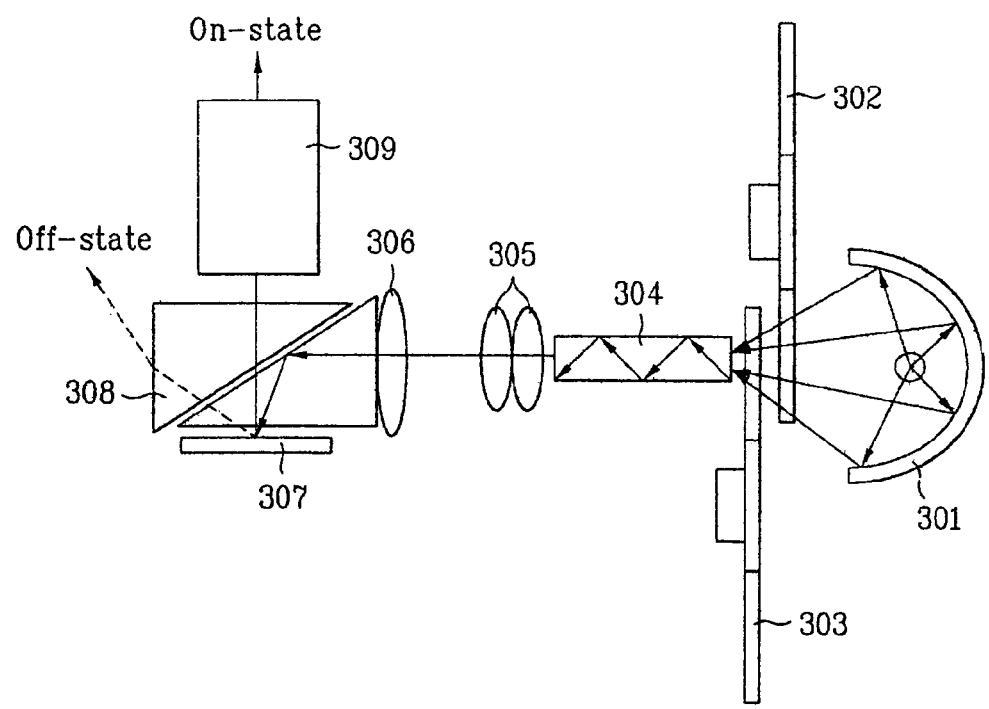

FIGS. 3A and 3B illustrate first and second color wheels of the image projector according to a third embodiment of the present invention. And, FIG. 3C illustrates an optical part of the image projector according to the third embodiment of the present invention.

Referring to FIG. 3A, the first color wheel 302 is formed of a red color filter, a green color filter, a blue color filter, and a white color filter each adequately arranged into four sections. And, as shown in FIG. 3B, the second color wheel 303 is formed of a red color filter, a green color filter, a blue color filter, and a white color filter arranged in four sections, wherein the red, green, and blue color filters are arranged to have an adequate size and the white color filter is formed to be smaller than the other color filters. It is preferable that the white color filter is minimized to the size to which the light emitted from the lamp is focused (i.e., a spot size).

The optical part of the image projector having the above described first and second color wheels applied thereto will now be described in detail with reference to FIG. 3C.

Referring to FIG. 3C, the first and second color wheels 302 and 303 are sequentially arranged between the lamp 301, which is the light source, and the rod lens 304. At this point, the second color wheel 303 is arranged so that any one of the color filter sections thereof overlaps with any one of the color filter sections of the first color wheel 302. Then, the first and second color wheel is selectively operated based on the selection of the user. In other words, when the first color wheel is operated, the second color wheel is stopped, and when the second wheel is operated, the first wheel is stopped.

More specifically, when the first color wheel 302 is operated, the white color filter section of the second color wheel 303 is fixed within an effective area of the optical path. On the other hand, when the second color wheel 303 is operated, the white color filter section of the first color wheel 302 is fixed within the effective area of the optical path. Herein, the effective area of the optical path refers to a cross-sectional area of the color wheel, when the light ray emitted from the lamp passes through the color wheel.

When the user desires to focus on the brightness of the image displayed through the projector, the white color filter section of the second color wheel 303 is positioned on the optical path. Then, the first color wheel 302 is rotated. Accordingly, the image projector can produce a bright image due to the relatively larger white color filter section of the first color wheel 302.

Conversely, the user desires to focus on the color definition of the image displayed through the projector, the white color filter section of the first color wheel 302 is positioned on the optical path. Then, by rotating the second color wheel 303, the image projector can produce an image represented by more natural and vivid colors.

Meanwhile, as shown in FIG. 3C, the first and second color wheels 302 and 303 are sequentially arranged between the lamp 301 and the rod lens 304. Alternatively, the first color wheel 302 can be arranged between the lamp 301 and the rod lens 304, and the second color wheel 303 can be arranged between the rod lens 304 and the first illuminating lens group 305.

The aforementioned image projector according to the third embodiment of the present invention does not require a separate controller to mechanically move the first and second color wheels. Nevertheless, the motor operation for each of the first and second color wheels should be controlled so as to represent the image desired by the user.

As described above, the image projector according to the present invention has the following advantages.

By representing a time-division color separating device in a plurality of color modes, the user can select one of image brightness and color definition through a single projector, when viewing a projected image.

Furthermore, the plurality of color modes can be selected according to the user's preference without distortion of the projected image.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display system comprising:
   an illumination source for projecting light toward an optical target;
   a color filter system configured to rotate about a first axis and disposed in a path of travel of the light projected by the illumination source, wherein the color filter system comprises:
      first and second co-centric multi-segment optical filters both configured to rotate about the first axis, wherein rotation of the first multi-segment filter about the first axis defines a first filter area for positioning in said path of travel, and wherein rotation of the second multi-segment filter about the first axis defines a second filter plane for positioning in said path of travel; and
      a moving mechanism configured to move the first and second co-centric multi-segment filters and the respective first and second filter areas in and out of said path of travel, such that moving the first filter area in said path of travel, removes the second filter area from said path of travel,
   wherein the first and second filter areas form first and second filter cylinders respectively, wherein each of the first and second filter cylinders is at least partially hollow to receive the optical target.

2. The display system of claim 1, wherein the first and second filter areas are co-planar.

3. The display system of claim 1, wherein the first filter area encloses the second filter area.

4. The display system of claim 1, wherein the first multi-segment filler comprises red, green and blue segments.

5. The display system of claim 1, wherein the second multi-segment filter comprises red, green, blue and white segments.

6. The display system of claim 1, wherein the first and second filter cylinders are juxtaposed along their longitudinal axes.

7. The display system of claim 6, wherein the first axis lies on the first and second cylinders' longitudinal axes.

* * * * *